US011822609B2

(12) United States Patent
Byrnes et al.

(10) Patent No.: US 11,822,609 B2
(45) Date of Patent: Nov. 21, 2023

(54) PREDICTION OF FUTURE PROMINENCE ATTRIBUTES IN DATA SET

(71) Applicant: SRI International, Menlo Park, CA (US)

(72) Inventors: John J Byrnes, Poway, CA (US); Clint Frederickson, Helena, MT (US); Kyle J McIntyre, Montana City, MT (US); Tulay Muezzinoglu, San Diego, CA (US); Edmond D Chow, Encinitas, CA (US); William T Deans, Allentown, PA (US)

(73) Assignee: SRI INTERNATIONAL, Menlo Park, CA (US)

( * ) Notice: Subject to any disclaimer, the term of this patent is extended or adjusted under 35 U.S.C. 154(b) by 759 days.

(21) Appl. No.: 14/997,447

(22) Filed: Jan. 15, 2016

(65) Prior Publication Data
US 2017/0076219 A1 Mar. 16, 2017

Related U.S. Application Data

(60) Provisional application No. 62/181,655, filed on Jun. 18, 2015.

(51) Int. Cl.
*G06F 16/93* (2019.01)
*G06N 20/00* (2019.01)
*G06F 40/30* (2020.01)

(52) U.S. Cl.
CPC .............. *G06F 16/93* (2019.01); *G06F 40/30* (2020.01); *G06N 20/00* (2019.01)

(58) Field of Classification Search
CPC ........ G06N 7/005; G06N 99/005; G06N 3/02; G06N 5/00; G06N 7/02; G06F 17/30011; G05B 13/00
See application file for complete search history.

(56) References Cited

U.S. PATENT DOCUMENTS

| 2009/0112892 A1* | 4/2009 | Cardie .................... G06F 17/27 |
| 2010/0179930 A1* | 7/2010 | Teller ..................... G06N 20/00 706/12 |
| 2010/0280985 A1* | 11/2010 | Duchon ................. G06Q 10/10 706/52 |

OTHER PUBLICATIONS

Yu et al, "The Research Collaboration in Chinese Cardiology and Cardiovasology Field", 2013, Information Journal of Cardiology, vol. 167, pp. 786-791. (Year: 2013).*
Murdick, "Finding Patterns of Emergence—Foresight and Understanding from Scientific Exposition (FUSE)", Jan. 9, 2014, IARPA, Office of the Director of National Intelligence. (Year: 2014).*
Trappey, "Using Patent Data for Technology Forecasting: China RFID Patent Analysis", 2011, Advanced Engineering Informatics, vol. 24, pp. 53-64. (Year: 2011).*

(Continued)

*Primary Examiner* — Miranda M Huang
*Assistant Examiner* — Robert Lewis Kulp
(74) *Attorney, Agent, or Firm* — Shumaker & Sieffert, P.A.

(57) ABSTRACT

Systems and methods for forecasting the prominence of various attributes in a future subject matter area are disclosed. An attribute is determined based on inputs received by a computing system. A set of indicators is determined based on the attribute and features extracted from an existing document set. The prominence of the attribute in the existing document set is determined. A prominence estimate of the attribute in a future document set is determined.

19 Claims, 8 Drawing Sheets

(56) References Cited

OTHER PUBLICATIONS

Radinsky et al. ("Mining the Web to Predict Future Events", WSDM'13, Feb. 4-8, 2013, Rome, Italy, pp., 1-10) (Year: 2013).*
Small et al. ("Identifying emerging topic in science and technology", Research Policy 43(2014) pp. 1450-1467), (Year: 2014).*
Tabner ("A Review of Concentration, Diversity, or Entropy Metrics in Economics, Finance, Ecology, and Communication Science", International Journal of Interdisciplinary Social Sciences Annual Review, Jan. 2007, pp. 1-9), (Year: 2007).*
Haslam et al ("What Makes an Article Influential? Predicting Impact in Social and Personality Psychology", Scientometrics, Jul. 2008, pp. 169-185) (Year: 2008).*
Sayyadi et al ("FutureRank: Ranking Scientific Articles by Predicting Their Future PageRank", Proceedings of the SIAM International Conference on Data Mining, SDM 2009, Apr. 30-May 2, 2009, pp. 1-12) (Year: 2009).*
Bi Chen ("Topic Oriented Evolution and Sentiment Analysis", PHD Dissertation, Pennsylvania State University, 2011, pp. 1-137) (Year: 2011).*
Yan et al ("To Better Stand on the Shoulder of Giants", JCDL'12, Jun. 10-14, 2012, Washington, DC, pp. 1-10) (Year: 2012).*
Yu et al. ("The research collaboration in Chinese cardiology and cardiovasology field", Information Journal of Cardiology, vol. 167 (2013), pp. 786-791), (Year: 2013).*
Dey et al. ("Obtaining Technology Insights from Large and Heterogeneous Document Collections", 2014 IEEE/WIC/ACM International Joint Conferences on Web Intelligence (WI) and Intelligent Agent Technologies (IAT), 2014, pp. 102-109) (Year: 2014).*
Chakraborty et al. ("Towards a Stratified Learning Approach to Predict Future Citation Counts", IEEE/ACM joint conference on digital libraries, 2014, pp. 1-10) (Year: 2014).*
Avishay Livne, Eytan Adar, Jamie Teevan, and Susan Dumais, Predicting Citation Counts Using Text and Graph Mining, iConference 2013, Feb. 12-15, 2013, Fort Worth, TX, USA, 4 pages.
Chen-Tse Tsai, Gourab Kundu, and Dan Roth, Concept-Based Analysis of Scientific Literature, CIKM '13, Oct. 27-Nov. 1, 2013, San Francisco, CA, USA, ACM 978-1-4503-2263-8/13/10, 6 pages.
Ralk Krestel and Padhraic Smyth, Recommending Patents Based on Latent Topics, 7th ACM Conference on Recommender Systems, Hong Kong, Oct. 12-16, 2013, 4 pages.
Kevin Bache, David Newman, and Padhraic Smyth, Text-Based Measures of Document Diversity, KDD '13, Aug. 11-14, 2013, Chicago, IL, USA, ACM 978-1-4503-2174-07/13/08, 9 pages.
Eytan Adar and Srayan Datta, Building a Scientific Concept Hierarchy Database (SCHBase), Proceedings of the 53rd Annual Meeting of the Association for Computational Linguistics, Beijing, China, Jul. 2015, 10 pages.
Artificial Intelligence May Tell US What's Going To Be Big In Science This Year, http://www.science20.com/news_articles/artificial_intelligence_may_tell_us_whats_going_to_be_big_in_science_this_year-165373(Feb. 2016).

* cited by examiner

PREDICTION OF FUTURE PROMINENCE ATTRIBUTES IN DATA SET

CROSS-REFERENCE TO RELATED APPLICATIONS

This application claims the benefit of and priority to U.S. Provisional Patent Application Ser. No. 62/181,655, filed Jun. 18, 2015, which is incorporated herein by this reference in its entirety.

GOVERNMENT RIGHTS

This invention was made in part with government support under contract number P22545 awarded by the Intelligence Advanced Projects Research Activity (IARPA). The United States Government has certain rights in this invention.

BACKGROUND

Researchers, scientists and engineers are constantly developing new technologies and discovering new phenomenon and processes. Once discovered, these emerging technical capabilities are frequently published in documents detailing the discoveries. These documents may take a number of forms, such as scientific articles or patents, for example. These documents may also be published in any number of different countries in any number of different languages.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
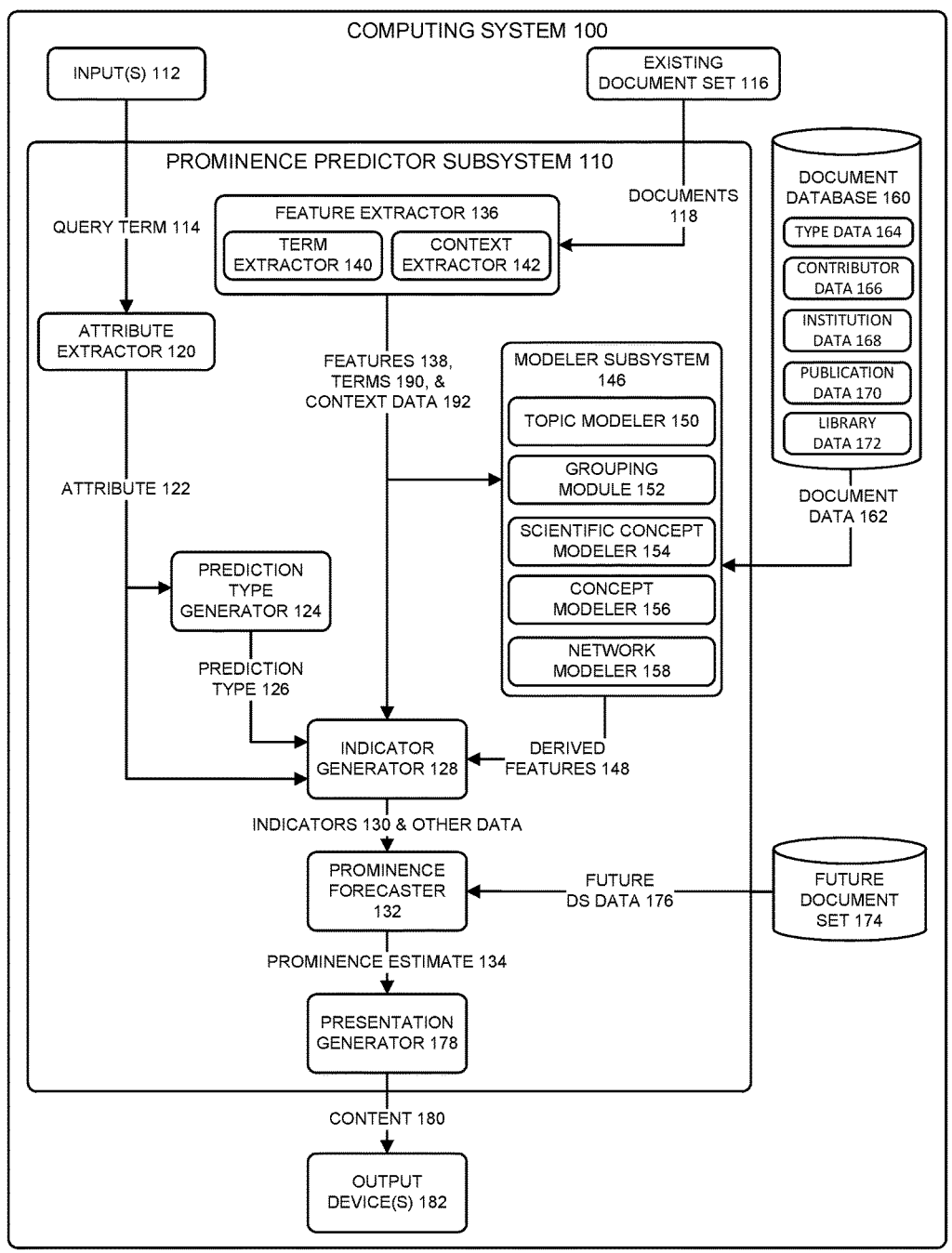
FIG. 1 is a simplified schematic diagram of at least one embodiment of an environment of a computing system comprising a prominence predictor subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Users of unstructured data, such as natural language text, images, and video, frequently need to glean useful information from the unstructured data. For example, decision makers may want to know how much money they are spending on certain activities according to specific classification criteria, such as scientific disciplines, technical fields, commercial markets, business units, or other topics or categories. The requests for information may be related to achieving specific objectives, such as a desire to know how much funding is being spent on particular types of projects. As used in this patent application, a "document" may refer to any piece of electronic content that may be compiled into a collection of information. For example, a document may include a text file, an audio file, a digital video file, a multimedia data file, or any other type of data file. As used in this patent application, a "data set" may refer to any collection of documents or files that are searchable. As used in this patent application, a "term" may refer to a word or a phrase. More generally, a data set (such as an unstructured data set) may comprise a plurality of items (such as documents), where each item in the data set has a number of features (e.g., terms).

Referring to FIG. 1, in one embodiment, a prominence predictor subsystem 110 executable by a computing system 100 is shown. The prominence predictor subsystem 110 is configured to recognize the emergence of technical capabilities as reflected in scientific publications and patent publications. In particular, the prominence predictor subsystem 110 is able to forecast the future prominence of terms in a specified subject matter area, as measured by the term's current prominence is a selected set of documents. The future prominence of a particular term may be forecasted based on the prominence of that particular term 190 in an existing document set 116 that includes a plurality of documents 118. To produce a prominence estimate 134, the prominence predictor subsystem 110 may generate a plurality of indicators 130 using both features 138 extracted directly from the plurality of documents, terms 190 and context data 192. To generate the derived features 148, a number of semantic models are generated using machine learning techniques and algorithms Many of the indicators 130 and features 138 of the present prominence predictor subsystem 110 are functions over time. As used in this application, prominence is an indication of the level of activity relating to the term in a document set. Prominence may relate to prominence in the existing document set 116. Prominence may also be embodied as a prominence estimate 134, or the prominence of the attribute 122 in a future document set 174.

The illustrative embodiment (e.g., native or virtual "runtime" or "execution" environment) of the computing system 100 includes the prominence predictor subsystem 110. The computing system 100 is capable of storing any number of items (e.g., documents or sets of documents) and the prominence predictor subsystem 110 is capable of modeling the prominence of a particular attribute in an existing document set 116 and forecasting the prominence of the particular attribute 122 in a future document set 174 based on this information. In the illustrative embodiment, the prominence predictor subsystem 110 receives or accesses one or more input(s) 112. In the illustrative embodiment, the one or more input(s) 112 may include a query term 114. The query term 114 may be embodied as any term from a reference set of terms relevant to the existing document set 116. The prominence predictor subsystem 110 also receives or accesses an existing document set 116 that comprises one or more documents 118. A document 118 may be embodied as any type of electronic data file, which includes at least unstructured text. The documents 118 may also include a number of features that are relevant to prominence predictor, for example, the type of document, persons who authored or contributed to the document, citations to or from the document, institutions that are affiliated with the document, and/or one or more terms included in the document. The documents 118 of the existing document set 116 may include a data indicator and may be published over a time interval beginning prior to and ending on or before a selected date. The existing document set 116 may be stored locally on the computing system 100, or may be stored elsewhere, depending on the application. In the event that the existing document set 116 is stored external to the computing system 100, the computing system 100 is able to access the existing document set 116 via one or more networks. The inputs 112 and the existing document set 116 are shown merely as illustrative examples, the computing system 100 and the prominence predictor subsystem 110 may be configured to store and analyze any number of inputs and document sets. The computing system 100 includes any requisite communication mechanism and protocols needed for effectuating a prominence analysis of the chosen data sets.

The illustrative prominence predictor subsystem 110 and its modules and subsystems are embodied as a number of machine-readable components, such as instructions, modules, data structures and/or other components, which may be implemented as computer hardware, firmware, software, or a combination thereof. Portions of the prominence predictor subsystem 110 may be executed by other computing devices in communication with computing system 100, as described below with reference to FIG. 7.

As shown in FIG. 1, the prominence predictor subsystem 110 may receive query term 114, or other input, and may apply an attribute extractor 120 to determine an attribute 122 that will be analyzed by the prominence predictor subsystem 110. The attribute 122 may be the aspect sought to be evaluated or predicted by the prominence predictor subsystem 110. In the illustrative embodiment, the attribute 122 comprises the query term 114. In other embodiments, however, the attribute 122 may be embodied as something other than a term. For example, the attribute 122 may be an author's name, a patent number, a title of an article, or other feature of a document that can be evaluated. The attribute extractor 120 may determine the attribute 122 that will be evaluated, and may determine a plurality of characteristics of the attribute 122. For example, if attribute 122 is embodied as a term, the attribute extractor 120 may identify various characteristics of the term, such as term length, and likely locations of the term in the documents of the existing document set 116.

The prominence predictor subsystem 110 may be configured to forecast the prominence of attributes 122 in a specific subject matter area. In the illustrative example, the attribute 122 is a specific term included in the query term 114. To forecast prominence properly, the prominence predictor subsystem 110 may gather properties of terms 190 present in existing document set 116. For example, the number of occurrences of the attribute 122 in the existing document set 116 and the contexts of the occurrences of the attribute 122 in the existing document set 116.

The attribute 122 is used to generate a prediction type 126 and a set of indicators 130. A prediction type generator 124 may receive the attribute 122 and may produce a prediction type 126 to be used by the prominence predictor subsystem 110 to generate the desired prominence estimate 134. The prediction type 126 may be determined based on the attribute 122 and includes the type of prediction problem to be solved by the prominence predictor subsystem 110. The prediction type 126 may include the number of occurrences of the attribute 122, the number of citations to the attribute 122 in subsequent literature, the geospatial distribution of occurrences of the attribute 122, the number of times the attribute 122 has been published, the number of patents granted related to the attribute 122, the number of citations of the attribute 122 in a manually selected data set, and/or other data that may be relevant to the attribute 122.

Using one of the attributes 122, the prediction type 126, data observed directly in the existing document set 116 (e.g., features 138), and data derived from the existing document set 116 (e.g., derived features 148), an indicator generator 128 may generate a set of indicators 130. A prominence forecaster 132 receives and uses the set of indicators 130 to generate a prominence estimate 134 of the attribute 122. As used in this application, indicators 130 are data that is directly input to into the forecast model to predict the prominence of the attribute 122.

As will be discussed in greater detail below, the set of indicators 130 may be chosen based on the attribute 122 and the prediction type 126. The prominence predictor subsystem 110 is designed to provide explanations to a variety of users. Different users will have different sets of requirements and may use the prominence predictor subsystem 110 for different types of analysis. When using the prominence predictor subsystem 110, users may want to know what is happening in current activities and how current activities are different from typical activities, for example. As such, not all indicators 130 are equally valuable to producing a prominence estimate 134 for a given prediction type 126. Some sets of indicators 130, or collections of indicators, provide better predictions for different prediction types 126. In the illustrative embodiment, different sets of indicators 130 are selected to be used by the prominence forecaster 132 based on the prediction type 126. In other embodiments, however, the prominence forecaster 132 uses all of the indicators 130 to determine a prominence estimate 134.

To generate indicators 130, a number of features 138 may be extracted from the documents 118 of the existing document set 116. A feature extractor 136 may receive the documents 118 of the existing document set 116 and may parse the documents 118 into a plurality of features 138. The features 138 may include data that is directly observable in the documents 118. The features 138 may include terms 190 extracted from structured and unstructured text of the documents 118 and context data 192 extracted from the documents 118. The feature extractor 136 includes a term extractor 140 to extract the terms 190 and a context extractor 142 to extract the context data 192 from the documents 118. The context data 192 of the features 138 may include data regarding the type of a document (e.g., scientific article or patent), persons who contributed to a document, institutions affiliated with the document, the publication series of the document, and/or other bibliographic and context information about each of the documents 118 in the existing document set 116. The context data 192 may be determined using metadata associated with each of the documents 118 or it may be extracted from the text of the documents 118. The features 138 of the existing document set 116 are transmitted to the indicator generator 128 and a modeler subsystem 146 to be used as indicators 130 or to be used to generate other derived features 148.

One example of an observable feature 138 is the date of each document 118. The publication date of a document 118 is important to understanding the history of a field, and may be used to predict the use of a given attribute in the future. More recent uses of an attribute 122 may be given more weight by the prominence predictor subsystem 110 than older uses of the attribute 122, for example. In the illustrative embodiment, the prominence predictor subsystem 110 may use the year of publication to date documents 118. Most if not all documents have dates, although the precision of the dates varies greatly between documents. Some documents may contain an exact date, others only month and year, and others may only provide a season and year (such as a quarterly journal). In other embodiments, the date data used by the prominence predictor subsystem 110 may include more date information than only the year of publication.

The features 138 of each document 118 may include both terms 190 and context data 192. As used in this patent application, a term 190 is a word or sequence of words as it appears in text. In the illustrative embodiment, the term extractor 140 may capture all single words and all sequences of two, three, or four words in each document 118 of the existing document set 116 as terms 190. In other embodiments, the term extractor 140 may capture more than four word sequences as terms 190. It is important to distinguish between a term 190 and a term occurrence. For example, the sentence: "The morning star is the evening star" contains five terms but seven term occurrences, because both terms "the" and "star" each occur twice. One way to measure the prominence of a term 190 in the existing document set 116 is based on counting the number of occurrences of that term 190 in a given year, for example.

As used herein, context data 192 may include all of the attributes and relationships a particular document 118 has with other entities. Context data 192 may be embodied as relationships between the document 118 and other persons, institutions, or publications series. Frequently, context data 192 may be derived from metadata occurring in the documents 118. For example, context data 192 may include authorship information, publication information, and/or information about the sponsoring institutions of the document 118.

To develop better prediction models, the prominence predictor subsystem 110 may generate a number of models based on the features 138 of the existing document set 116. As used in this application, a model is a data structure that includes relationships between various data elements. Some of the relationships that may be included in a model may include, for example, "IsA," "Contains," "IsLearnedFrom," "IsAssignedBy," "OccursAs," "Cites," "ContributesTo," "PublishedIn," and/or "IsAffiliatedWith." As shown in FIG. 1, a modeler subsystem 146 may receive the features 138 of the existing document set 116 and develop derived features 148 of the existing document set 116. The derived features 148 may summarize properties of the existing document set 116 and include a number of semantic models developed using machine learning techniques, for example. As will be discussed in more detail below, the illustrative embodiment of the modeler subsystem 146 includes a topic modeler 150, a grouping module 152, a scientific concept modeler 154, a concept modeler 156, and a network modeler 158. In other embodiments, however, the modeler subsystem 146 may include other types of models and modules to generate derived features 148.

The modeler subsystem 146 uses natural language processing, which is a form of unsupervised machine learning where information is generated solely from the language contained in the surveyed content (e.g., the existing document set 116) without reference to categorizations done by people, to generate the derived features 148. The modeler subsystem 146 also includes processes that use human generated information. For example, the modeler subsystem 146 may receive document data 162 from a document database 160 to assist in generating derived features 148. For example, the document database 160 may include type data 164, contributor data 166, institution data 168, publication data 170, and library data 172. The document database 160 may be stored locally on the computing system 100, or may be stored elsewhere, depending on the application. In the event that the document database 160 is stored external to the computing system 100, the computing system 100 is able to access the document database 160 via one or more networks. The document database 160 may include human-generated content.

The type data 164 includes characteristics related to the type of document 118 in question. For example, each patent may be a different type of patent with different classes and subclasses. In contrast, a scientific article will not have those characteristics, but instead will have its own defining features. The type data 164 may include lists of these characteristics and data regarding the various documents so that additional information about each document 118 may be used by the modeler subsystem 146.

Similarly, the contributor data 166, the institution data 168, and the publication data 170 may include data about various aspects of each document 118. For example, the contributor data 166 may include data about various authors or inventors of a document 118 such as the author's resume and reputation in the industry. Contributor data 166 may also include information about the relationships persons have with each other, which may be derived from the authorship and citation relations.

The institution data 168 may include data about the reputation and activities of institutions affiliated with the document 118. An institution, which sponsors a document 118, may be a government agency, a university, or a commercial entity. Certain institutions may be prominent in certain research areas, so association of documents and terms with these institutions may be appropriate and may indicate prominence.

The publication data 170 may include data about the publication series in which the particular document 118 appears. The publication series is a group articles. Articles that appear in the same publication series are generally intended to address the same audience and will frequently be on related subject matter. Using publication data 170 as a proxy to organize subject matter is a helpful to model the overall flow of research. Because some publication series are more prestigious than other publication series, terms 190 appearing in more prestigious publication series may be given more weight in the prominence forecast. A scientific journal is the principal example of a publication series, but an annual technical report might also be captured as a publication series as well. In practice, publication series are generally identified by their ISSN value, usually present as metadata of a document 118.

The contributor data 166, the institution data 168, and the publication data 170 may also include reputation information about the relevant entity and or a topic distribution 206 related to the relevant entity. This data 166, 168, 170 may also include other data related to its respective entity that is useful to analyze attributes and terms present in the existing document set 116. In some embodiments, the reputation of any document affiliate—a person, institution, or publication series—is a function of citation count. Highly cited document producers are assigned high reputation scores, as they will likely be highly cited in the future.

The library data 172 in the document database 160 relates to the connections between documents 118, specifically citations to and from various documents 118. Using the library information, the modeler subsystem 146, and more specifically the network modeler 158, generates citation data related to the existing document set 116.

Figure 2:
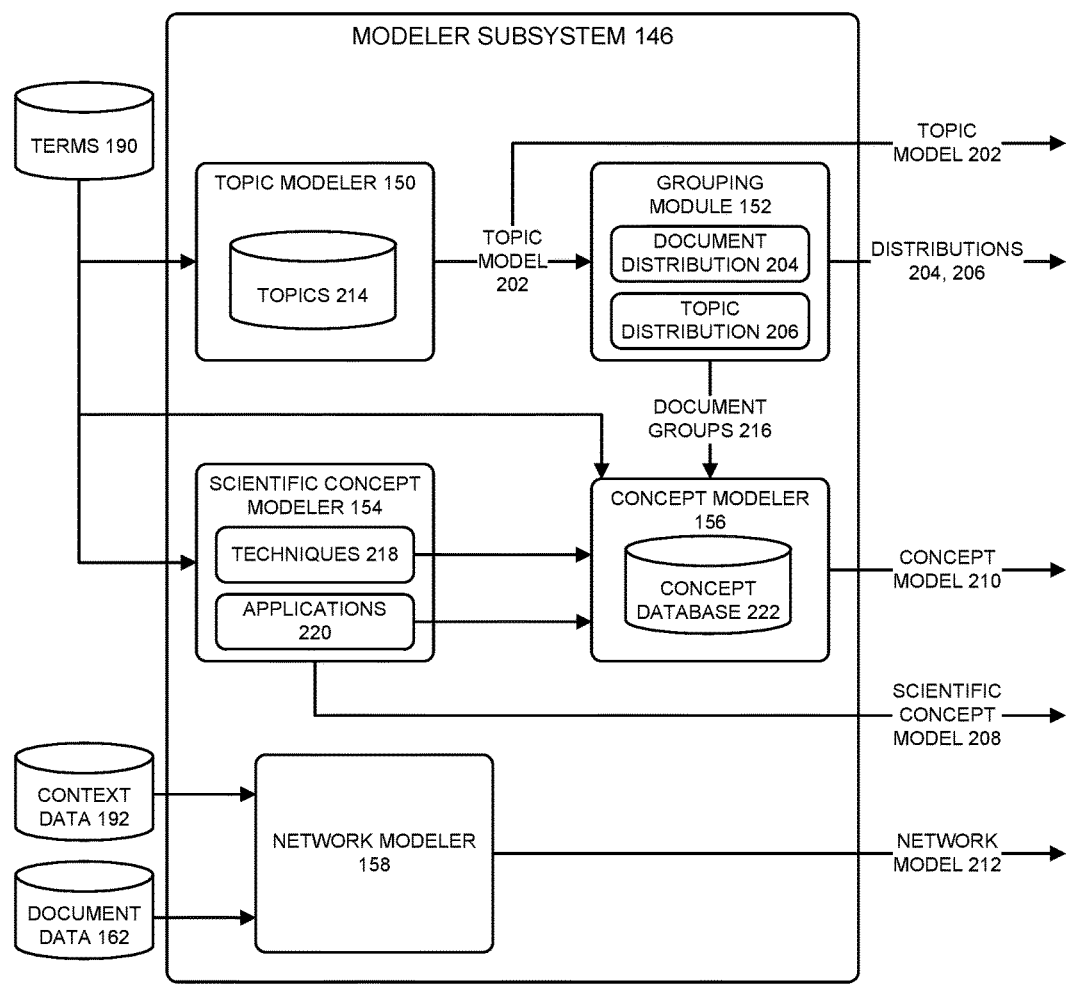
FIG. 2 is a simplified schematic diagram of at least one embodiment of a modeler subsystem of the prominence predictor subsystem shown in FIG. 1.

The modeler subsystem 146 of the prominence predictor subsystem 110 receives a number of different types of data to produce derived features 148. The modeler subsystem 146 may use co-clustering techniques to generate models using the features (e.g., terms and context data) of the existing document set 116. As shown in FIG. 2, the modeler subsystem 146 may include a topic model 202, a document distribution 204, a topic distribution 206, a scientific concept model 208, a concept model 210, and a network model 212.

The topic modeler 150 of the modeler subsystem 146 may be configured to determine a topic model 202 for the existing document set 116. The topic modeler 150 may receive the terms 190 from the feature extractor 136 and may assign each occurrence of a term 190 to a topic 214. A given term 190 may occur in multiple topics. For example, the term "genetic" may occur in a biomedical topic and in a computer algorithms topic, when used in "genetic algorithms," for example.

The data in topics 214 generally captures a much narrower meaning than "subject category," but a much broader meaning than a single word, which generally has a unique meaning. For example, some words may have multiple meanings, and topic modeler 150 may disambiguate these meanings by associating words together. For example, the term "cellular" has one meaning when associated with "DNA," "protein," "metabolic process," and a different meaning when associated with "telephony," "communications," and "wireless." Thus, topics may present meanings, which are less ambiguous than terms, narrower than subjects, and semantically much broader than a single disambiguated term meaning, for example.

The topics 214 may be learned directly from the terms 190 in the existing document set 116 using, for example, a co-clustering algorithm, or the topics 214 may be developed by a taxonomy of terms. In the illustrative embodiment, the topic modeler 150 may compute a Latent Dirichlet Allocation (LDA) topic model 202 for the existing document set 116. This topic model 202 may define a set of latent variables, called topics 214. The topics 214 are not directly observed in the existing document set 116, but are treated as latent variables by the model 202. The topics 214 are thus inferred based on the overall structure of the existing document set 116 and not on the properties of individual documents 118.

A topic 214 in a topic model 202 formalizes the informal concept of a topic of discourse. The topic model 202 may comprise 100 unique topics, for example. In other embodiments, however, the topic model 202 may include more or less unique topics, depending on the application. In topic modeler 150, every occurrence of every term 190 may be assigned to exactly one topic 214. Consequently, the number of available topics and the breadth of each topic are inversely related. Distribution of terms 190 over topics 214 may also be generated. As will be discussed more below, the ubiquity of terms 190 likely indicates a lack of prominence for the term.

Using the topic model 202, the documents 118, and the terms 190, the grouping module 152 may be configured to generate document distributions 204 and topic distributions 206. These distributions 204, 206 may be derived directly from the topic model 202. As discussed above, every term occurrence may be assigned to a topic 214. A topic distribution 206 may be the indication of how many occurrences of a given term 190 occur in each topic 214. For example, maybe 50% of the occurrences of the term cellular are in a biology topic, 30% are in a medicine topic, and 20% are in a topic on telecommunications. Additionally, other topic distributions 206 may be generated by determining how many term occurrences in an existing document set 116 have been contributed by a given person, or are in documents 118 with which a given institution is affiliated.

Document distributions 204 may indicate how each document 118 is modeled as a distribution over topics 214. By modeling documents 118 as distributions over topics 214, documents 118 may be grouped together in document groups 216. Other modules and elements may use the document groups 216 to derive additional models and features.

The scientific concept modeler 154 and the concept modeler 156 may be focused on extracting more precise information from terms 190 of the existing document set 116 than the topic modeler 150. The scientific concept modeler 154 may use natural language processing techniques to recognize mentions of techniques 218 (i.e., tools for solving problems) and applications 220 (i.e., problems to be solved) in the existing document set 116. Based on these techniques 218 and applications 220, the scientific concept modeler 154 may generate a scientific concept model 208. The techniques 218 and the applications 220 are recognized in the existing document set 116 based on their contexts. Using techniques 218 and applications 220, the prominence predictor subsystem 110 may track the attention individual concepts are receiving from different communities. By understanding what problems a particular community is attempting to solve, different concepts may be correlated with any given attribute 122 and a better prominence estimate 134 may be obtained. The frequency with which an attribute 122 occurs in an application 220, a technique 218, and the ratio of these types of occurrences, may be informative about prominence. In particular, tracking the ratios of occurrences in applications 220 and techniques 218 over time may be especially informative. For example, terms 190 that cease appearing in applications 220 and begin appearing in techniques 218 are problems that are becoming solved well enough to be used as tools to solve other problems. All of this information may be included in the scientific concept model 208.

The concept modeler 156 is configured to determine a concept model 210 by assigning documents 118, terms 190, document groups 216, to different concepts stored in a concept database 222. The concepts generally relate to a predetermined taxonomy of categories to which each of the documents 118 and terms 190 may be assigned. In some embodiments, the concept modeler 156 uses labeled data to make the concept model 210. In some embodiments, the concept modeler 156 uses the technique 218 and the application 220 information determined by the scientific concept modeler 154 to determine the concept model 210.

Figure 3:
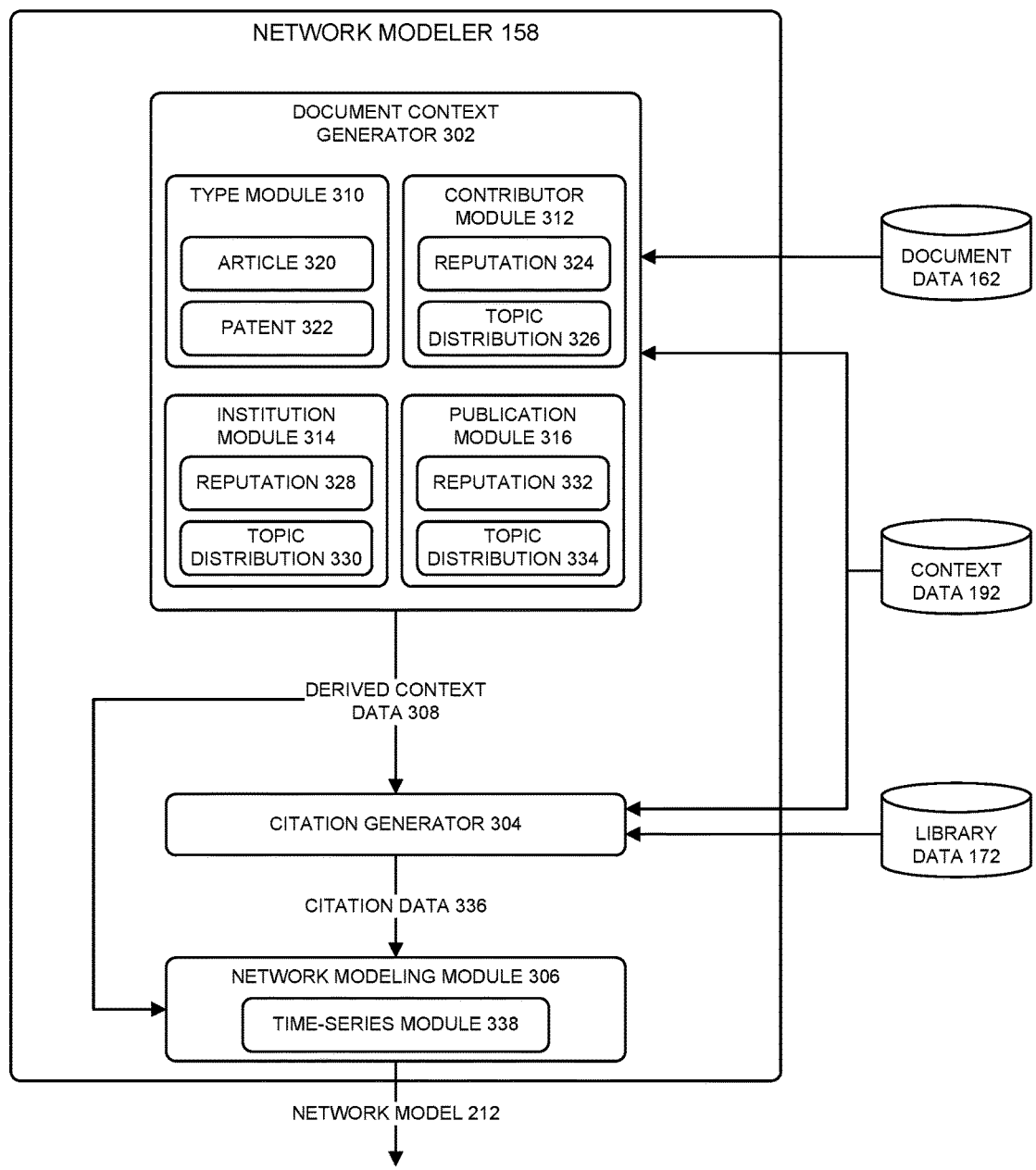
FIG. 3 is a simplified schematic diagram of at least one embodiment of a network modeler of the prominence predictor subsystem shown in FIG. 1.

The network modeler 158 is configured to receive context data 192 and document data 162 and generate a network model 212. As shown in FIG. 3, the network modeler 158 includes a document context generator 302, a citation generator 304 and a network modeling module 306. A resulting network model 212 may include both static data and time-dependent data.

The document context generator 302 may be configured to generate derived context data 308 that includes additional information related to the original context data 192 extracted from the existing document set 116. As discussed previously, each document 118 may include context data 192 such as the document type, contributors to the document, institutions associated with the document, and the publication information of the document. This information extracted from the documents 118 alone, however, may not provide any context about the types, contributors, institutions, or publication series. The document context generator 302 may receive or access the document data 162 in the document database 160 in response to receiving the context data 192 and generates the derived context data 308.

The document context generator 302 illustratively includes a type module 310, a contributor module 312, an institution module 314, and a publication module 316. In other embodiments, the document context generator 302 may include additional modules related to different types of information related to the documents 118. Each of the modules 310, 312, 314, 316 are configured link the context data 192 to related document data 162 such as, for example, type data 164, contributor data 166, institution data 168, and publication data 170.

The type module 310 is configured to determine the type of each document 118 and assign additional features and information to the document 118 based on the type of document. For example, the type module 310 may determine that a document 118 is an article 320, such as a scientific article. In such a case, the type module 310 identifies a number of characteristics of the document 118 and populates those characteristics with information obtained from the type data 164. In another example, the type module 310 may determine that the document 118 is a patent 322. In such a case, the type module 310 will determine the type of patent and the classes and subclasses of the patent 322, for example. The type module 310 may also determine other characteristics of each document 118.

The contributor module 312 may be configured to determine which persons contributed to a document 118 (e.g., authors) and assign additional features and information to the document based on the contributor. The contributor module 312 may determine a reputation 324 of a contributor to the document 118. Additionally, the contributor module 312 may determine a topic distribution 326 related to the identified contributor based on the contributor data 166. The topic distribution 326 includes a distribution of the body of work of that particular contributor over the topics 214. The prominence forecaster 132 may use the reputation 324 and the topic distribution 326 of the contributor to weight the prominence of given attributes 122 in the existing document set 116.

The institution module 314 may be configured to determine which institutions are affiliated with a document 118 (e.g., a government organization, a university, or a publishing house) and assign additional features and information to the document 118 based on the institution. The institution module 314 may determine a reputation 328 of the institution affiliated with the document 118, or the institution module 314 may determine a topic distribution 330 related to the institution. The topic distribution 330 includes a distribution of the body of work of that particular institution over the topics 214. The prominence forecaster 132 may use the reputation 328 and the topic distribution 330 of the institution to weight the prominence of given attributes 122 in the existing document set 116.

The publication module 316 may be configured to determine which publication series the document 118 appeared in (e.g., a scientific journal) and assign additional features and information to the document 118 based on the publication series. The publication module 316 may determine a reputation 332 of the publication series affiliated with the document 118, or the publication module 316 may determine a topic distribution 334 related to the publication series. The topic distribution 334 includes a distribution of the body of work of that particular publication series over the topics 214. The prominence forecaster 132 may use the reputation 332 and the topic distribution 334 of the publication series to weight the prominence of given attributes 122 in the existing document set 116.

The derived context data 318 includes all of the features, characteristics, and data discussed above regarding the type module 310, the contributor module 312, the institution module 314, and the publication module 316. In other embodiments, the derived context data 318 may include other types of information and data that might be related to the documents 118 and the existing document set 116.

The citation generator 304 of the network modeler 158 is configured to generate citation data 336. The citation data 336 may include information and statistical analysis about the documents that cite a particular document and the documents that are cited by a particular document. For documents 118 that are articles, citations to other documents may be found in the bibliography of the document 118. Citations are frequently used as a significant indicator of scientific impact. Citation and co-citation networks are derived from the context data 192 and the library data 172. The citations and co-citation networks are used to determine attention to a particular concept or reputation of an author, institution, or publication series. After determining the citation data 336 for each of the documents 118 in the existing document set 116, the citation generator 304 sends the citation data 336 to the network modeling module 306.

The network modeling module may 306 receive the derived context data 318 and the citation data 336 and generates the network model 212. The network model 212 may include both static data and dynamic data that changes as a function over time. The network modeling module 306 includes a time-series module 338 to generate the dynamic data. Generally, the information in the derived context data 318 and the citation data 336 includes some type of date component. With that date component, the time-series module 338 generates a plurality of dynamic data to include in the network model 212. For example, dynamic data may include data indicative of citations to a particular document over a time interval.

Figure 4:
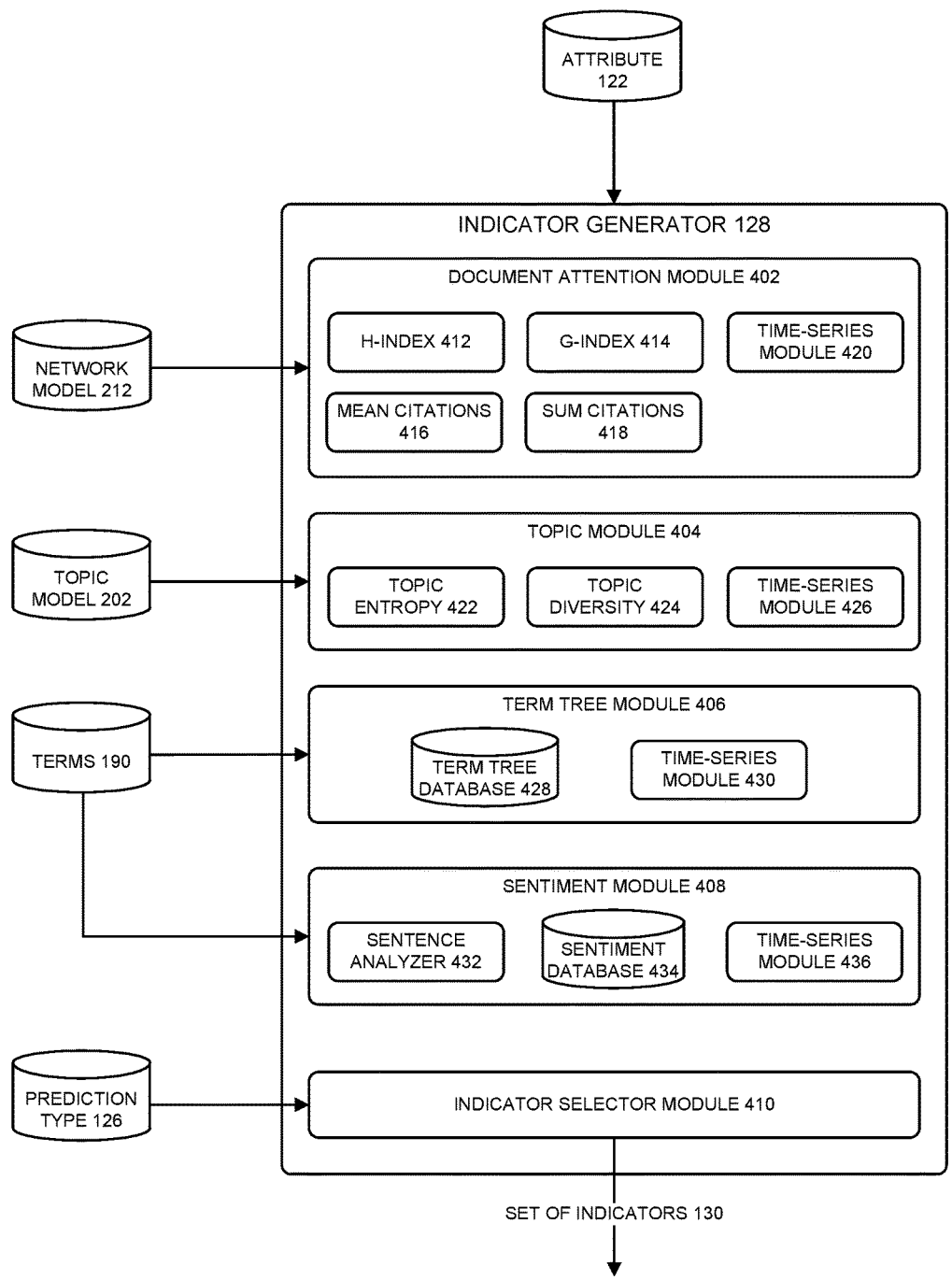
FIG. 4 is a simplified schematic diagram of at least one embodiment of an indicator generator of the prominence predictor subsystem shown in FIG. 1.

As discussed previously, the indicator generator 128 may receive the attribute 122, the features 138, and the derived features 148 and determines a set of indicators 130 based on the prediction type 126. As shown in FIG. 4, the indicator generator 128 includes a document attention module 402, a topic module 404, a term tree module 406, a sentiment module 408, and an indicator selector module 410. Each of these modules are configured to generate indicators 130 that may be used by the prominence forecaster 132 to model the prominence of an attribute 122 in the existing document set 116 and estimate the prominence in a future document set 174.

The document attention module 402 may receive the network model 212 and generate a plurality of document attention indicators indicative of the document-cites-document relationship of documents 118 in the existing document set 116. In the illustrative embodiment, the document attention module 402 may generate an H-index indicator 412, a G-index indicator 414, a mean citations indicator 416, and sum citations indicator 418. The document attention module 402 may also include a time-series module 420 configured to plot each of the other document attention indicators as functions over time. This adds a dynamic component to the document attention indicators that may be exploited by the prominence forecaster 132 to produce more accurate prominence estimates 134. The document attention indicators disclosed above are done by way of illustration only. In other embodiments, other document attention indicators are generated. To determine these document attention indicators, the document attention module 402 may use forward citations from documents 118, backward citations to documents 118, or the text of the documents 118.

The H-index indicator 412, or Hirsch-index, is used in bibliometrics to quantify an individual's impact on a field. In typical use, an individual who has published at least h papers each of which has been cited at least h times has an index of h. The H-index indicator 412 of the document attention module 402 is an abstraction of the typical usage. As used in this application, the H-index indicator 412 is an index to any set of documents, not just to documents written by a single individual. In some embodiments, the set of citing sources can be restricted in any uniform way, rather than simply defining the index from all available sources.

In order to recognize rising prominence, the H-index indicator 412 may be adapted to apply to sets of documents specific to the attribute 122 for which the prominence predictor subsystem 110 is forecasting prominence. When the attribute 122 is a person, the document attention module 402 may use the set of documents 118 to which that person contributed. When the attribute 122 is a document 118, the document attention module 402 may use the set of documents that this document cites. When the attribute 122 is a term 190, the document attention module 402 uses the set of documents that contain this term 190. When looking at the citing documents, the document attention module 402 considers only citations into the chosen document set from a given year. Thus, the time-series module 420 can derive a time series that tells us how many documents cite into the document set each year.

The G-index indicator 414 is typically used to quantify research productivity of an individual based on the publication record of the individual. A document 118 has an index of g, if there is a set of g documents in the set that average at least g citations per document. Like the H-index indicator 412, the G-index indicator 414 may be applied to individuals, documents 118, or terms 190. The mean citations indicator 416 is defined as the mean number of forward citation of documents in set of documents. The sum citations indicator 418 is defined as the total number of forward citations of documents in set of documents.

The topic module 404 may receive the topic model 202 and generate a plurality of topic indicators that are derived directly from the topic model 202. In the illustrative embodiment, the topic module 404 may generate a topic entropy indicator 422 and a topic diversity indicator 424. The topic module 404 also includes a time-series module 426 configured to plot each of the other topic indicators as functions over time. In other embodiments, other topic indicators indicative of the various topics 214 of the topic model 202 may also be generated.

As discussed above, the topic modeler 150 may assign term 190 occurrences to topics 214. The grouping module 152 may measure the distribution of the occurrences of a term 190 over the topics 214 to which they are assigned, and create a topic distribution 206. The prominence predictor subsystem 110 may also measure the distribution of the occurrences of terms 190 in a given document 118 over topics 214 and the distribution of occurrences of terms 190 written by a given person or organization over topics 214.

Topics may represent at least one group terms around content areas. For example, if a specific topic has been gaining popularity the past few years, then terms associated with the specific topic are likely to receive more attention in the near future. Beyond the raw topics themselves, the topic module 404 may generate a topic entropy indicator 422 and a topic diversity indicator 424 to measure properties of the distribution of terms 190 over topics 214. The topic entropy indicator 422 may measure how many different topics 214 to which a particular term 190 is assigned. A term 190 with high entropy may be assigned to many different topics 214; a term 190 with low entropy may be assigned to a small number of topics (often a single topic). The topic diversity indicator 424 measures the relatedness of each topic 214 to which a particular term 190 is assigned. A term 190 with high diversity not only touches on different topics 214, but it touches on topics 214 that are not often associated. Suppose, for example, that topic 1 is about the theory of quantum dots, topic 2 is about the application of quantum dots, and topic 3 is about the genetic structure of prairie grass. A term 190 distributed evenly over topics 1 and 2 may have the same entropy 422 as a term 190 distributed evenly over topics 2 and 3, but the latter may have a much higher diversity 424 (assuming that theory and application of quantum dots are often discussed together while quantum dots and prairie grass are not).

The term tree module 406 receives the terms 190 and generates a term tree indicator indicative of the relatedness between different terms 190. In the illustrative embodiment, the term tree module 406 generates the term tree indicator using a term tree database 428 and time-series module 430. The time-series module 430 is also configured to plot the term tree indicators as functions over time. In other embodiments, other term tree indicators indicative of the other measures of relatedness between terms may be generated.

Figure 8:
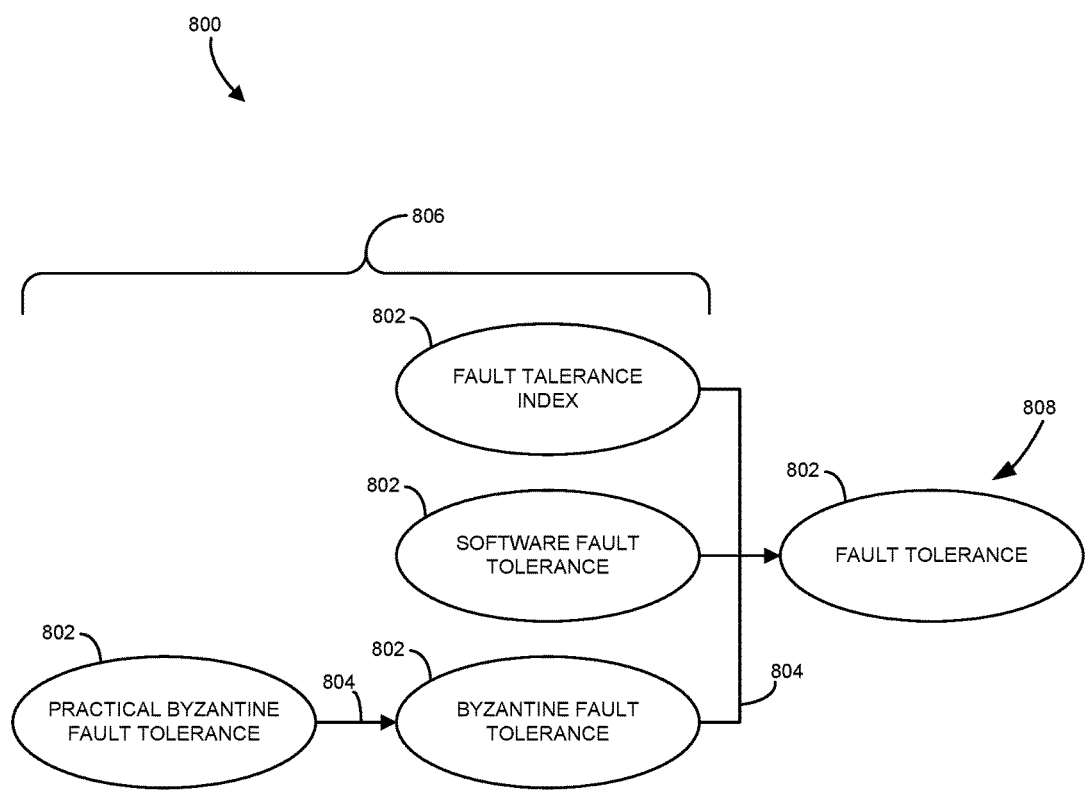
FIG. 8 is a simplified diagram of at least one embodiment of term tree.

The term tree indicators are based on the construction of family trees of terms 190. The term tree module 406 generates a vocabulary of terms independent of the term lists extracted by the feature extractor 136, and stores the vocabulary of terms in the term tree database 428. In some embodiments, the vocabulary of terms includes many terms specific to a particular subject matter area including abbreviations, such as " . . . support vector machines (SVMs)." The term tree module 406 builds a phylogenetic graph 800 of the vocabulary of terms by generating a node 802 for each term and an edge 804 directed from each extension of a term to the term itself. For example, "fault tolerance index" and "software fault tolerance" would both be children of "fault tolerance", as shown in FIG. 8. The term tree module 406 annotates each node 802 of the term tree 800 with the first year that the term entered the vocabulary of terms (based on the data corpus). From this data, the time-series module 430 may determine in any given year how many new descendants 806 a term received that year. Growth of the term tree 800 may indicate active work on extending the core ideas.

This indicates that the core ideas (the ancestors 808 in the graph 800) are active and can be expected to continue to be discussed in the future. The time-series module 430 may generate a term tree time-series indicator indicative of the number of new nodes 802 formed each year.

The sentiment module 408 may receive the terms 190 and generate sentiment indicators indicative of subjective information included in the documents 118. Sentiment may be generally extracted from the documents using natural language processing and computational linguistics. In the illustrative embodiment, the sentiment module 408 may include a sentence analyzer 432, a sentiment database 434, and a time-series module 436. The time-series module 436 is configured to plot the sentiment indicators as functions over time. In other embodiments, other sentiment indicators indicative of other subjective information may be generated.

The sentence analyzer 432 of the sentiment module 408 may perform analysis of sentences containing attributes 122 in the existing document set 116. To determine sentiment indicators for terms 190 generally, the sentence analyzer 432 may collect all sentences published in the existing document set 116 that include the attribute 122 and analyzes those sentences. The sentiment module 408 may compare the analyzed sentences to learned information already included in the sentiment database 434. The time-series module 436 may organize the sentiment indicators as functions over time to generate a sentiment time-series indicator. The sentiment module 408 scores the sentiment of each sentence and sums these scores in order to arrive at a sentiment score for the term 190 itself.

Additional indicators 130 that may be used by the prominence predictor subsystem 110 may include a geospatial distribution indicator and a cross-corpus indicator. The geospatial distribution indicator is built on a geospatial model of the Earth. The geospatial distribution indicator looks at the geographical diversity of the institutions affiliated with a given document or term. To construct a geospatial model, the entire Earth, or other physical area is divided into nodes/regions. The edges between nodes/regions are weighted by the number of documents 118 in the existing document set 116 that are co-authored by individuals living in both regions. Based on this weighting, the connectedness between different nodes/regions is computed. In an illustrative embodiment, the nodes/regions are 100-kilometer hexagonal regions on a grid. In other embodiments, the nodes/regions may be countries or some other division of the physical area. Initial indicators were computed based on the hex grid covering of the physical area (e.g., Earth). Indicators computed based on the nodes/regions being countries has analytic value and predictive value for the prominence forecaster 132. A number of different features are used to compute the geospatial distribution indicator. Examples of these features may include the connectedness between nodes/regions using the term 190, the sum of all connectedness between every node/region that uses the term 190, the number of nodes/regions containing the term 190, and a Clark-Evans distribution of all authors using the term 190.

The cross-corpus indicator may indicate prominence across distinct document sets. Generating topic models works well when similar documents are clustered together to form the topic model. For example, the topic model based on scientific articles is robust when compared to other scientific articles and a topic model based on patents is robust when compared with other patents. However, in general, topic models learned from scientific articles may not provide useful information when applied to a set of patent documents. Essentially, documents for distinct data sets use language differently enough that topic models derived from one set of documents may not generally be used on a different set of documents. To create a cross-corpus alignment indicator, the indicator generator 128 may cluster each distinct set of documents separately; measure the significance of each term to each cluster; weight the significance of each term to each cluster; compare subject-specific terms between the corpora; and determine which terms are significant to both distinct set of documents. In this way, a cross-corpus alignment indicator includes data of the prominence of related terms in another document set.

The indicator selector module 410 may receive the prediction type 126 and generate a set of indicators 130 from the plurality of indicators to input into the prominence forecaster 132. As will be discussed in more detail, some indicators 130 are better predictors of some prediction types 126. Using this information, the indicator selector module 410 is configured to select the indicators suited to generate a prominence estimate 134 for the prediction type 126.

Figure 5:
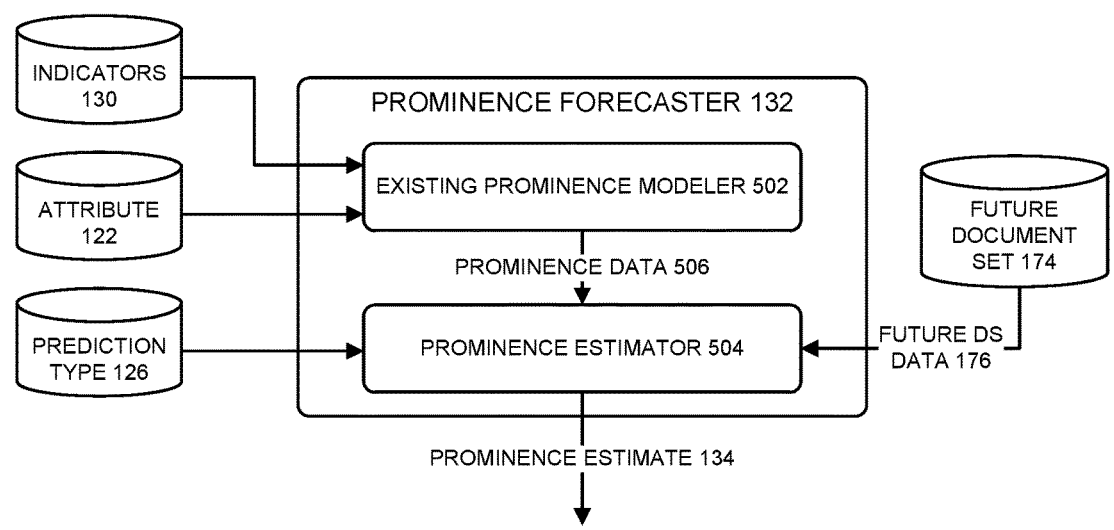
FIG. 5 is a simplified schematic diagram of at least one embodiment of a prominence forecaster of the prominence predictor subsystem shown in FIG. 1.

The prominence forecaster 132 may receive a set of indicators 130 from the indicator generator 128 and generates a prominence estimate 134. As shown in FIG. 5, the prominence forecaster 132 may include an existing prominence modeler 502 and a prominence estimator 504. The prominence modeler 502 may apply one or more statistical models to the set of indicators 130 to determine the prominence of the selected attribute 122 in the existing document set 116 and generate prominence data indicative of the prominence. The prominence modeler 502 plots the historical data points of the time-series indicators 130 received from the indicator generator 128. Using those plots, the prominence modeler 502 applies a statistical model such as a linear regression, a logistic regression, a neural network, or a random forest, to identify trends in the existing document set 116 identified by the indicators 130.

The prominence estimator 504 receives the prominence data 506 generated by the prominence modeler 502 and generates the prominence estimate 134. The prominence estimator 504 also receives the prediction type 126 and future document set data 176 related to the future document set 174. The prominence estimate 134 is different depending on which subject matter area prominence is being estimated. For example, estimating the prominence of the term "cellular" in the biology space will yield different results than estimating the prominence of the term "cellular" in the telecommunications space. The prominence estimator receives or accesses the future document set data 176, which is indicative of the subject matter area for which the prominence is being forecasted. The prominence estimator 504 extrapolates the prominence data 506 and generates a prominence estimate 134 for the future document set 174. In the illustrative embodiment, the prominence estimate 134 extends three years into the future from the current date. However, in other embodiments, other time periods of prominence estimates 134 may be computed.

In an illustrative embodiment, the prominence forecaster 132 may generate a continuous valued variable with values ranging zero through one as the prominence estimate 134. Additionally, the prominence estimate 134 may include a continuous value between zero and one as a prediction of prominence and it includes a binary value, which is zero to indicate "nonprominent" and one to indicate "prominent." The binary value of prominence is compared to a prominence threshold to determine whether it indicates prominence. In an illustrative embodiment, a term is considered prominent when its binary prominence value is at least 0.3. In other embodiments, however, the prominence threshold may be set at different values. The prominence forecaster 132 also uses a classification random forest, which generates a probability estimate that a term is prominent. A threshold for nomination of prominent terms is selected which maximizes precision and recall. In certain applications, different threshold multipliers are used to maximize the performance of the prominence forecaster 132 across different subject matters included in the document sets 116, 174. In some embodiments, these multipliers are between 80% and 95%.

In order to produce a prominence estimate 134 from a confidence score, the prominence forecaster 132 may produce a prominence forecast of 0 for a confidence of 0, a prominence forecast of 0.3 for a confidence score equal to our nomination threshold (selected by the algorithm just described above), and a prominence forecast of 1 for a confidence of 1. In an illustrative embodiment, the prominence forecaster 132 interpolates linearly for confidence scores between zero and 0.3 or between 0.3 and 1.

Referring back to FIG. 1, a presentation generator 178 may receive the prominence estimate 134 and generate interactive content 180 to output to a user of the prominence predictor subsystem 110. The interactive content 180 may be configured to allow a user to alter the attribute 122, the prediction type 126, the time period of the prominence estimate 134 and other factors to generate the desired prominence estimate 134. The content 180 is sent to one or more output devices 182 of the computing system 100. The output devices 182 may include personal computing device, a desktop, a laptop, a smartphone, a printer, a speaker, and/or other output device that may be connected to a computing system 100. The output devices 182 are configured to output the estimated future prominence 134 of the attribute 122 to the user of the prominence predictor subsystem 110.

Figure 6:
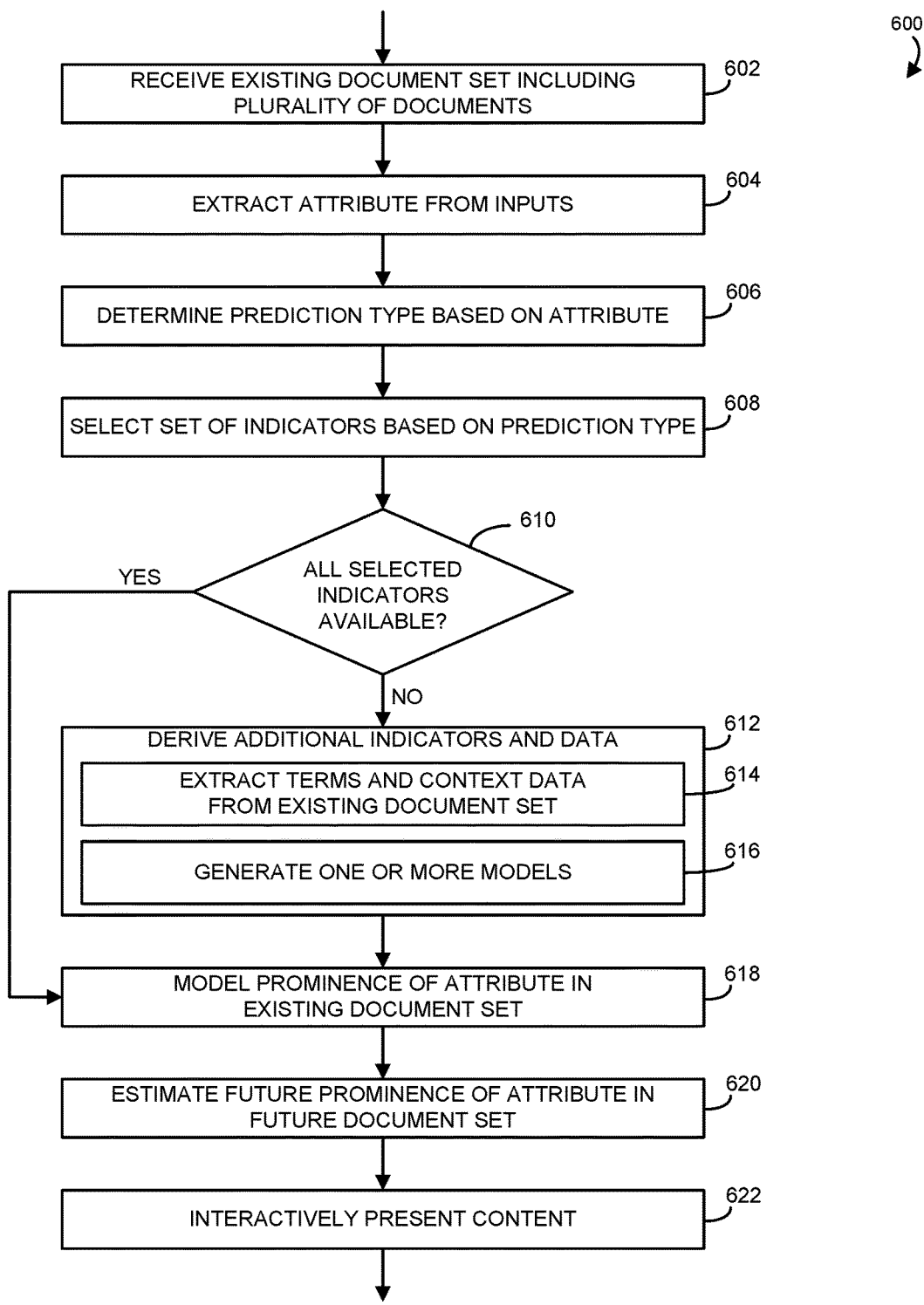
FIG. 6 is a simplified flow diagram of at least one embodiment of a method for estimating the prominence of an attribute in a document set executable by a computing system, such as the computing system of FIG. 1.

Referring to FIG. 6, a simplified flow diagram of at least one embodiment of a process 600 executable by the computing system 100 is shown. The process 600 may be embodied as computerized programs, routines, logic and/or instructions executed by the computing system 100, for example by one or more of the modules and other components shown in FIG. 1 described above. The process 600 may be configured to produce a future prominence estimate of an attribute of a document set based on the prominence of the attribute in an existing document set. At block 602, the computing system 100 may receive or access an existing document set including a plurality of documents. The existing document set may become the basis for a current measure of prominence for the attribute.

At block 604, the computing system 100 may receive one or more inputs and extract at least one attribute from those one or more inputs. The one or more inputs may be generated by a user of the computing system 100 and may include a query term. The query term may be a combination of one or more words that a user wants to determine an estimate of the prominence. Based on the inputs, which may be the query term or some other type of input, the system 100 may then extract at least one attribute that will be used to determine prominence. At block 606, the computing system 100 may determine a prediction type based on the at least one attribute extracted from the inputs. The prediction type may be indicative of the type of prominence the user wants predicted. For example, if the attribute is a term, the prediction type may be occurrences of that term in the future in particular subject matter field or a particular publications series.

At block 608, the computing system 100 may select a set of indicators to be used to determine a prominence estimate for the at least one attribute. Each of the indicators in the set of indicators includes a set of features extracted from the existing document set. Some of the features may be directly observable in the existing document set, but other features must be derived from data in the document set. For example, the terms of a document in the existing document set are an observable feature, but the topic model may be a derived feature of the existing document set. The topic model may require occurrences of terms to be assigned to one or more topics.

At block 610, the computing system 100 may determine whether all of the selected indicators are currently available to be input into a prominence forecaster to produce a prominence model. If all, or a necessary portion, of the selected indicators are available, the method 600 proceeds to block 618 in which the computing system 100 models the prominence of the attribute in the existing document set. If not all of the indicators are available, the method 600 proceeds to block 612 in which the computing system 100 derives additional data and indicators. While in the illustrative embodiment, the method 600 shows indicators being generated after selecting a prediction type, in other embodiments, the indicators may be generated prior to or contemporaneously with blocks 602-608.

To derive the additional data and indicators, block 612 may also include block 614 and block 616. At block 614, the computing system extracts a plurality of features from the existing document set, including terms and context data. The terms include phrases of one or more words extracted from the unstructured text of each document. The context data may generally include information about the documents themselves. Such as who is an author of the document, what institutions are affiliated with the document, or in what publication series did the document appear. The context data may be determined using metadata associated with each of the documents or it may be derived from the text of the documents themselves. At block 616, the computing system uses the features extracted from the existing document set to generate derived features. The derived features may include one or more models. The one or more models may be generated as described above. Using the features extracted from the existing document and the derived features, the computing system 100 generates any indicators not already present.

At block 618, the computing system 100 may use the set of indicators to model the prominence of the attribute in the existing document set. To model the prominence, the computing system 100 may apply one or more statistical algorithms to the selected set of indicators. The statistical algorithms may include determining a regression that matches the time-dependent data of the indicators.

At block 620, the computing system 100 then uses the prominence model of the attribute in the existing document set to estimate the prominence of the attribute in a future document set. The future document set may include the attributes of the existing document set except the documents in the future document set will be published over an interval beginning at the last date of the existing document set to some date beyond that. In other embodiments, the future document set may be unrelated to the existing document set. The prominence estimate may include applying one or more statistical models to extrapolate the prominence measured from the existing data set into the future data set.

At block 622, the computing system 100 may interactively present content to a user of the computing system 100, the content including the estimated future prominence of the attribute. The content may be presented using one or more output devices of the computing system.

Figure 7:
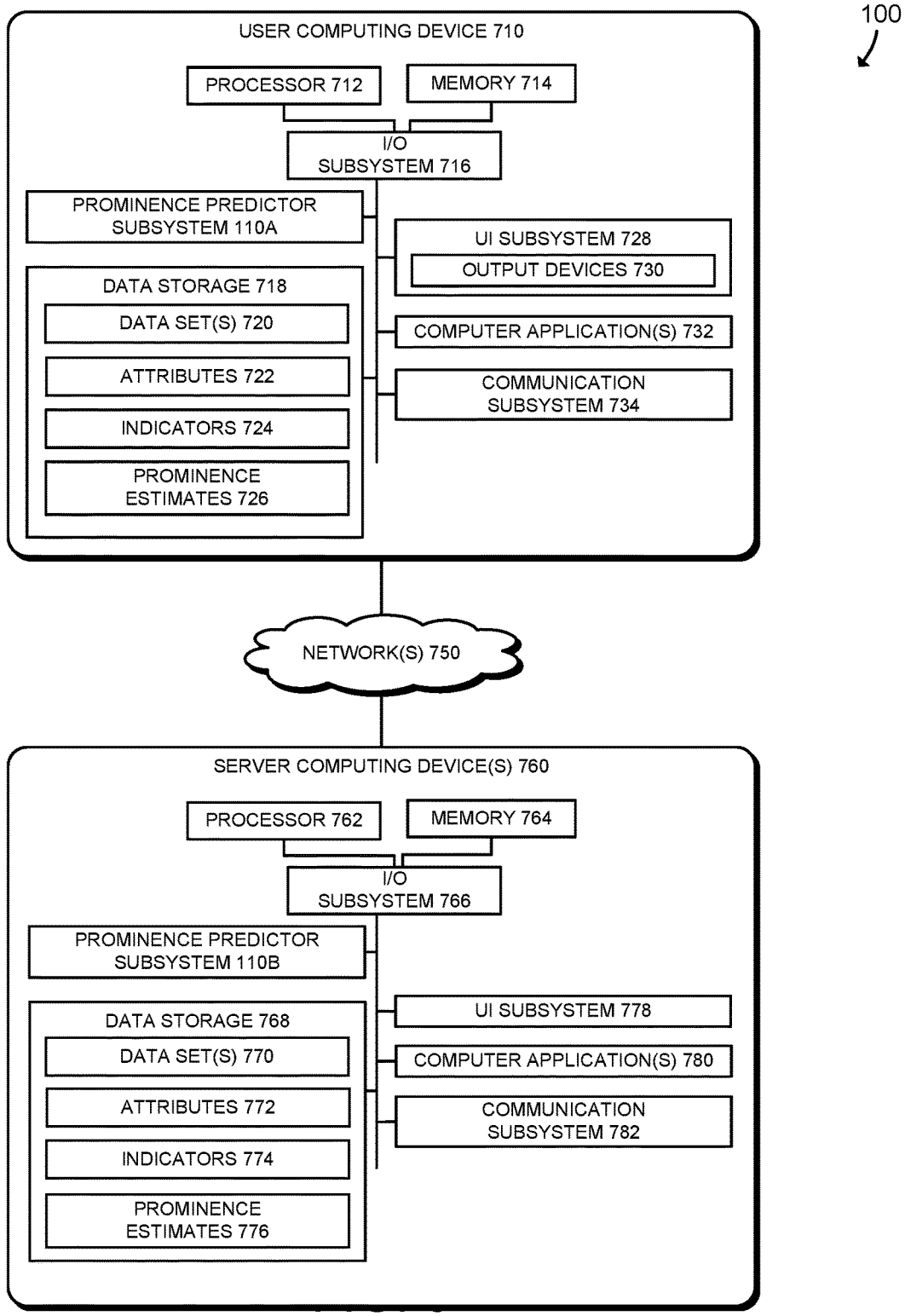
FIG. 7 is a simplified block diagram of at least one embodiment of a computing environment in which the content analyzer subsystem of FIG. 1 may be implemented.

Referring now to FIG. 7, a simplified block diagram of an embodiment of the computing system 100 is shown. While the illustrative computing system 100 is shown as involving multiple computing devices, it should be understood that in some embodiments, the computing system 100 may constitute a single computing device alone. The computing system 100 includes a user computing device 710, which may be in communication with one or more server computing devices 760 via one or more networks 750. The prominence predictor subsystem 110, or portions thereof, may be distributed across multiple computing devices 710, 760 that are connected to the network(s) 750 as shown. In other embodiments, however, the prominence predictor subsystem 110 may be located entirely on the computing device 710. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a search engine, content organization system, content management system, big data analytics applications, and/or other, applications, systems and devices. As used herein, "module," "component," "subsystem" and similar terminology may refer to computer code, i.e., software developed using a programming language such as Java, Python, or C++, which may be stored in computer memory, e.g., as executable instructions embodied in one or more transitory or non-transitory computer readable media.

The illustrative computing device 710 includes at least one processor 712 (e.g. a microprocessor, microcontroller, digital signal processor, etc.), memory 714, and an input/output (I/O) subsystem 716. The computing device 710 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of hardware and software components and/or other computing systems including a "front end" of the prominence predictor subsystem 110A, a user interface subsystem 728, which includes one or more user input devices (e.g., one or more microphones, touchscreens, keyboards, virtual keypads, etc.) and one or more output devices 730 (e.g., speakers, displays, LEDs, haptic devices, etc.). The I/O subsystem 716 is also communicatively coupled to one or more data storage media 718, one or more computer applications 732, and a communication subsystem 734. It should be understood that each of the foregoing components and/or systems may be integrated with the computing device 710 or may be a separate component or system that is in communication with the I/O subsystem 716 (e.g., over a network 750 or a serial bus connection).

The data storage media 718 may include one or more hard drives or other suitable data storage devices (e.g., flash memory, memory cards, memory sticks, and/or others). In some embodiments, portions of the prominence predictor subsystem 110A, data set(s) 720, attributes 722, indicators 724, prominence predictions 726, and/or other data reside at least temporarily in the data storage media 718. Portions of the prominence predictor subsystem 110A and/or other data may be copied to the memory 714 during operation of the computing device 710, for faster processing or other reasons.

The communication subsystem 734 may communicatively couple the computing device 710 to one or more communication networks 750, e.g., a local area network, wide area network, personal cloud, enterprise cloud, public cloud, and/or the Internet, for example. Accordingly, the communication subsystem 734 may include one or more wired or wireless network interface software, firmware, or hardware, for example, as may be needed pursuant to the specifications and/or design of the particular computing system 100.

The server computing device(s) 760 may be embodied as any suitable type of computing device capable of performing the functions described herein, such as any of the aforementioned types of devices or other electronic devices. For example, in some embodiments, the server computing device(s) 760 may include one or more server computers including data storage media 768, which may be used to store "back end" portions of the prominence predictor subsystem 110B, data set(s) 770, attributes 772, indicators 774, prominence predictions 776, and/or other data. The illustrative server computing device 760 includes one or more processors 762, memory 764, an I/O subsystem 766, data storage media 768, a user interface subsystem 778, computer applications 780, and a communication subsystem 782, each of which may be embodied similarly to the corresponding components of the user computing device 710, respectively, described above. The computing system 100 may include other components, sub-components, and devices not illustrated in FIG. 7 for clarity of the description. In general, the components of the computing system 100 are communicatively coupled as shown in FIG. 7 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

In an example 1, a prominence predictor system includes one or more computing devices configured to: extract an attribute from input received by the one or more computing devices; determine a prediction type based on the attribute; select a plurality of indicators based on the prediction type, each indicator comprising a set of features extracted from an existing document set comprising documents semantically related to the attribute and published over a time interval beginning prior to and ending on or before a current date; model the prominence of the attribute in accordance with the plurality of indicators in the existing document set over the time interval using one or more statistical modeling techniques; estimate future prominence of the attribute based on the model in a future document set that do not currently exist relative to prominence of the attribute in the existing document set; and interactively present content relating to the estimated future prominence of the attribute by one or more output devices of the one or more computing devices.

An example 2 includes the subject matter of example 1, and the attribute may be associated with a feature extracted from at least one document of the existing document set, the attribute having a number of characteristics including an observed count of occurrences of the attribute in the existing document set, and the prediction type comprises a predicted count of occurrences of the attribute in the future document set based at least in part on the observed count of occurrences of the attribute in the existing document set. An example 3 includes the subject matter of example 1, and the set of indicators may include a subset of observable indicators having observed data extracted from the existing document set and a subset of derived indicators having derived data learned from the existing document set, the derived data being semantically determined from the observable data through the use of machine learning techniques.

An example 4 includes the subject matter of example 1, and the system may also be further configured to derive a topic model for the existing document set through the use of machine learning techniques, the topic model comprising a plurality of topics, each topic including a set of terms extracted from the documents of the existing document set, wherein every occurrence of a term in the existing document set is assigned to at least one of the topics of the topic model. An example 5 includes the subject matter of example 4, and each document of the existing document set includes a first semantic representation of the document as a distribution over topics in the topic model; and each topic of the topic model includes a second semantic representation of the topic as a distribution over terms that occur in the existing set of documents.

An example 6 includes the subject matter of example 1, and the system may also be further configured to determine a sentiment parameter for the attribute when the attribute is a term extracted from the documents of the existing document set, the sentiment parameter is indicative of whether an author of the term in the documents of the existing document set liked or disliked the attribute, the sentiment parameter being determined by analyzing each sentence containing the term in the existing set of documents. An example 7 includes the subject matter of example 1, and the system may also be further configured to determine document attention indicators indicative of a count of citations of the documents in the existing data set. An example 8 includes the subject matter of example 1, and the set of indicators may include static features having a single nominal value and dynamic features having data that changes as a function over time. An example 9 includes the subject matter of example 1, and to interactively present content may further includes to determine the content output by the output devices based on the selected prediction type and the selected set of indicators used to determine the estimated future prominence, wherein the selected set of indicators are used to structure the content presented. An example 10 includes the subject matter of example 1, and the system may also be further configured to predict whether the estimated future prominence of the attribute will exceed a prominence threshold. An example 11 includes the subject matter of example 1, and the estimated future prominence may include data indicative of the future prominence of the attribute over time and the future prominence of the attribute over a geospatial distribution.

An example 12 includes the subject matter of example 1, and the prediction types include at least one of the following: a number of occurrences of the attribute in the future document set, a number of citations in the future document set to a document in the existing document set, a geospatial distribution of occurrences of the attribute in the future document set, a number of times the attribute is published in the future document set, and/or the number of patents issued in the future document set. An example 13 includes the subject matter of example 1, and the system may also be further configured to generate a geospatial model by dividing a geospatial area into a plurality regions; weight the connectedness between regions based on the number of documents co-authored by individuals from the regions; and determine a geospatial distribution of the attribute based on the occurrences of the attribute in each geospatial region and the connectedness between geospatial regions.

In an example 14, a method for predicting prominence of an attribute of at least one document of an existing document set in a future document set with a computing system having one or more computing devices, the method comprising: extracting the attribute from input received by the computing system; based on the attribute, determining a prediction type; based on the prediction type, selecting a set of indicators, each indicator comprising a set of features extracted from the existing document set, the existing document set comprising documents semantically related to the attribute and published over a time interval beginning prior to and ending on or before a current date; with the indicators, modeling prominence of the attribute in the existing document set over the time interval using one or more statistical modeling techniques; based on the model, estimating future prominence of the attribute in a set of documents that do not currently exist relative to prominence of the attribute in the existing document set; and interactively presenting content relating to the estimated future prominence of the attribute by one or more output devices of the computing system.

An example 15 includes the subject matter of example 14, and selecting the set of indicators further includes selecting one indicator based on how predictive the selected indicator is of the prediction type and based on how much information the selected indicator conveys about the existing document set. An example 16 includes the subject matter of example 14, and includes deriving a topic model for the existing document set through the use of machine learning techniques, the topic model comprising a plurality of topics, each topic including a set of terms extracted from the documents of the existing document set, wherein every occurrence of a term in the existing document set is assigned to one of the topics of the topic model. An example 17 includes the subject matter of example 14, and includes analyzing each sentence containing the attribute in the existing set of documents; and determining a sentiment parameter for the attribute, the sentiment parameter being indicative of whether an author of the term in the documents of the existing document set liked or disliked the attribute, the sentiment parameter being determined by analyzing each sentence containing the term in the existing set of documents.

In an example 18, a prominence predictor system comprising, embodied in one or more non-transitory machine accessible storage media, instructions configured to cause one or more computing devices to: extract an attribute from input received by the one or more computing devices; based on the attribute, determine a prediction type; based on the prediction type, select a set of indicators, each indicator comprising a set of features extracted from an existing document set comprising documents semantically related to the attribute and published over a time interval beginning prior to and ending on or before a current date; with the indicators, model prominence of the attribute in the existing document set over the time interval using one or more statistical modeling techniques; based on the model, estimate future prominence of the attribute in a future document set that do not currently exist relative to prominence of the attribute in the existing document set; and interactively present content relating to the estimated future prominence of the attribute by one or more output devices of the one or more computing devices.

An example 19 includes the subject matter of example 18, and includes instructions configured to derive a topic model for the existing document set through the use of machine learning techniques, the topic model comprising a plurality of topics, each topic including a set of terms extracted from the documents of the existing document set, wherein every occurrence of a term in the existing document set is assigned to one of the topics of the topic model. An example 20 includes the subject matter of example 18, and includes instructions configured to: analyze each sentence containing the attribute in the existing set of documents; and determine a sentiment parameter for the attribute, the sentiment parameter being indicative of whether an author of the term in the documents of the existing document set liked or disliked the attribute, the sentiment parameter being determined by analyzing each sentence containing the term in the existing set of documents.

An example 21 includes the subject matter of example 18, and includes instructions configured to predict whether the estimated future prominence of the attribute will exceed a prominence threshold. An example 22 includes the subject matter of example 18, and includes instructions configured to estimate the future prominence of the attribute over time and estimate the future prominence of the attribute over a geospatial distribution. An example 23 includes the subject matter of example 18, and the attribute is associated with a feature extracted from at least one document of the existing document set, the attribute having a number of characteristics including an observed count of occurrences of the attribute in the existing document set, and the prediction type comprises a predicted count of occurrences of the attribute in the future document set based at least in part on the observed count of occurrences of the attribute in the existing document set. An example 24 includes the subject matter of example 18, and the set of indicators includes a subset of observable indicators having observed data extracted from the existing document set and a subset of derived indicators having derived data learned from the existing document set, the derived data being semantically determined from the observable data through the use of machine learning techniques. An example 25 includes the subject matter of example 18, and indicators of the set of indicators include static features having a single nominal value and dynamic features having values that change as a function over time.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof (e.g., software written using a programming language such as Java, C++, and/or Python). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A prominence predictor system comprising one or more computing devices configured to:
   in response to an attribute extracted from input received by the one or more computing devices, determine a prediction type based on the attribute, wherein the prediction type includes a geospatial distribution of occurrences of the attribute in a future document set that does not currently exist, wherein the attribute is a term extracted from documents of an existing document set and wherein to obtain the geospatial distribution of occurrences the one or more computing devices are further configured to:

generate a geospatial model by dividing a geospatial area into a plurality of regions;

weight connectedness between regions based on the number of documents co-authored by individuals from the regions; and determine a geospatial distribution of the attribute based on occurrences of the attribute in each geospatial region and the connectedness between geospatial regions;

obtain a plurality of sets of indicators, wherein each of the plurality of sets of indicators is generated for use by a prominence forecaster for a particular prediction type of a plurality of different prediction types;

select, from the plurality of sets of indicators, a set of indicators for the attribute based on the prediction type, each indicator comprising a set of features extracted from the existing document set comprising documents (i) semantically related to the attribute and (ii) published over a time interval beginning prior to and ending on or before a date;

process the set of indicators for the attribute to model the prominence of the attribute in the existing document set over the time interval;

after selecting the set of indicators for the attribute, in response to determining an indicator of the set of indicators is not available to be input to a prominence forecaster to produce the model, derive the indicator from the features extracted from the existing document set using co-clustering techniques applied to the existing document set; and input the set of indicators including the derived indicator to the prominence forecaster to produce the model;

use the model to determine a future prominence of the attribute, in the future document set that does not currently exist, over the geospatial distribution of the attribute; and in response to the input, output content relating to the future prominence of the attribute for interactive presentation to a user of the one or more computing devices.

2. The system of claim 1, wherein:

the attribute is associated with a feature extracted from at least one document of the existing document set, the attribute having a number of characteristics including an observed count of occurrences of the attribute in the existing document set, and the prediction type comprises a predicted count of occurrences of the attribute in the future document set based at least in part on the observed count of occurrences of the attribute in the existing document set.

3. The system of claim 2, wherein to interactively present content further includes to determine the content output based on the prediction type and the selected set of indicators used to determine the future prominence, wherein the selected set of indicators are used to structure the content presented.

4. The system of claim 1, wherein the set of indicators includes a particular set of observable indicators having observed data extracted from the existing document set and a particular set of derived indicators having derived data learned from the existing document set, the derived data being semantically determined from the observable data through a machine learning technique.

5. The system of claim 1, wherein the one or more computing devices are further configured to determine a sentiment parameter for the attribute when the attribute is a term extracted from the documents of the existing document set, the sentiment parameter is indicative of whether an author of the term in the documents of the existing document set liked or disliked the attribute, the sentiment parameter being determined by analyzing each sentence containing the term in the existing document set.

6. The system of claim 1, wherein indicators of the set of indicators include static features having a single nominal value and dynamic features having data that changes as a function over time.

7. The system of claim 1, wherein the one or more computing devices are further configured to predict whether the future prominence of the attribute will exceed a prominence threshold.

8. The system of claim 1, wherein the future prominence includes data indicative of (i) the future prominence of the attribute over time and (ii) the future prominence of the attribute over a geospatial distribution.

9. The system of claim 1, wherein the prediction type includes at least one of the following: a number of occurrences of the attribute in the future document set, a number of citations in the future document set to a document in the existing document set, a number of times the attribute is published in the future document set, or a number of patents issued in the future document set.

10. A method for predicting prominence of an attribute of at least one document of an existing document set in a future document set with a computing system having one or more computing devices, the method comprising:

in response to an attribute extracted from input received by the one or more computing devices, determining a prediction type based on the attribute, wherein the prediction type includes a geospatial distribution of occurrences of the attribute in a future document set that does not currently exist, wherein the attribute is a term extracted from documents of an existing document set and wherein obtaining the geospatial distribution of occurrences comprises:

generating a geospatial model by dividing a geospatial area into a plurality of regions; weighting connectedness between regions based on the number of documents co-authored by individuals from the regions; and determining a geospatial distribution of the attribute based on occurrences of the attribute in each geospatial region and the connectedness between geospatial regions;

obtaining a plurality of sets of indicators, wherein each of the plurality of sets of indicators is generated for use by a prominence forecaster for a particular prediction type of a plurality of different prediction types;

selecting, from the plurality of sets of indicators, a set of indicators for the attribute based on the prediction type, each indicator comprising a set of features extracted from the existing document set comprising documents (i) semantically related to the attribute and (ii) published over a time interval beginning prior to and ending on or before a date;

processing the set of indicators for the attribute to model the prominence of the attribute in the existing document set over the time interval;

after selecting the set of indicators for the attribute, in response to determining an indicator of the set of indicators is not available to be input to a prominence forecaster to produce the model, derive the indicator from the features extracted from the existing document set using co-clustering techniques applied to the existing document set; and input the set of indicators including the derived indicator to the prominence forecaster to produce the model;

using the model to determine a future prominence of the attribute in a future document set that does not currently exist over the geospatial distribution of the attribute; and in response to the input, outputting content relating to the future prominence of the attribute for interactive presentation to a user of the one or more computing devices.

11. The method of claim 10, wherein selecting the set of indicators further includes selecting one indicator based on how predictive the selected indicator is of a prediction type and based on how much information the selected indicator conveys about the existing document set.

12. The method of claim 10, further comprising:
analyzing each sentence containing the attribute in the existing document set; and
determining a sentiment parameter for the attribute, the sentiment parameter being indicative of whether an author of the term in documents of the existing document set liked or disliked the attribute, the sentiment parameter being determined by analyzing each sentence containing the term in the existing document set.

13. A prominence predictor system comprising, embodied in one or more non-transitory machine accessible storage media, instructions configured to cause one or more computing devices to:
in response to an attribute extracted from input received by the one or more computing devices, determine a prediction type based on the attribute, wherein the prediction type includes a geospatial distribution of occurrences of the attribute in a future document set that does not currently exist, wherein the attribute is a term extracted from documents of an existing document and wherein to obtain the geospatial distribution of occurrences the one or more computing devices are further configured to:
generate a geospatial model by dividing a geospatial area into a plurality of regions;
weight connectedness between regions based on the number of documents co-authored by individuals from the regions; and determine a geospatial distribution of the attribute based on occurrences of the attribute in each geospatial region and the connectedness between geospatial regions;
obtain a plurality of sets of indicators, wherein each of the plurality of sets of indicators is generated for use by a prominence forecaster for a particular prediction type of a plurality of different prediction types;
select, from the plurality of sets of indicators, a set of indicators for the attribute based on the prediction type, each indicator comprising a set of features extracted from the existing document set comprising documents (i) semantically related to the attribute and (ii) published over a time interval beginning prior to and ending on or before a date;
process the set of indicators for the attribute to model the prominence of the attribute in the existing document set over the time interval;
after selecting the set of indicators for the attribute, in response to determining an indicator of the set of indicators is not available to be input to a prominence forecaster to produce the model, derive the indicator from the features extracted from the existing document set using co-clustering techniques applied to the existing document set; and input the set of indicators including the derived indicator to the prominence forecaster to produce the model;
use the model to determine a future prominence of the attribute in a future document set that does not currently exist over the geospatial distribution of the attribute; and in response to the input, output content relating to the future prominence of the attribute for interactive presentation to a user of the one or more computing devices.

14. The prominence predictor system of claim 13, further comprising instructions configured to cause the one or more computing devices to:
analyze each sentence containing the attribute in the existing document set; and
determine a sentiment parameter for the attribute, the sentiment parameter being indicative of whether an author of the term in the documents of the existing document set liked or disliked the attribute, the sentiment parameter being determined by analyzing each sentence containing the term in the existing document set.

15. The prominence predictor system of claim 13, further comprising instructions configured to cause the one or more computing devices to predict whether the future prominence of the attribute will exceed a prominence threshold.

16. The prominence predictor system of claim 13, further comprising instructions configured to cause the one or more computing devices to estimate the future prominence of the attribute over time.

17. The prominence predictor system of claim 13, wherein:
the attribute is associated with a feature extracted from at least one document of the existing document set, the attribute having a number of characteristics including an observed count of occurrences of the attribute in the existing document set, and
the prediction type comprises a predicted count of occurrences of the attribute in the future document set based at least in part on the observed count of occurrences of the attribute in the existing document set.

18. The prominence predictor system of claim 13, wherein the set of indicators includes a particular set of observable indicators having observed data extracted from the existing document set and a particular set of derived indicators having derived data learned from the existing document set, the derived data being semantically determined from the observable data through a machine learning technique.

19. The prominence predictor system of claim 13, wherein indicators of the set of indicators include static features having a single nominal value and dynamic features having values that changes as a function over time.

* * * * *